June 3, 1958 E. S. DAVIS 2,837,637

SIGNAL MIXER CIRCUIT

Filed Dec. 9, 1954 2 Sheets-Sheet 1

ERWIN STUART DAVIS
INVENTOR.

BY Rudolph J. Junick
ATTORNEY

June 3, 1958 E. S. DAVIS 2,837,637

SIGNAL MIXER CIRCUIT

Filed Dec. 9, 1954 2 Sheets-Sheet 2

ERWIN STUART DAVIS
INVENTOR.

BY Rudolph J. Juick
ATTORNEY

United States Patent Office 2,837,637

Patented June 3, 1958

2,837,637

SIGNAL MIXER CIRCUIT

Erwin Stuart Davis, Newark, N. J., assignor, by mesne assignments, to Daystrom, Incorporated, Murray Hill, N. J., a corporation of New Jersey Application December 9, 1954, Serial No. 474,104

1 Claim. (Cl. 250—20)

This invention relates to a signal mixer circuit and more particularly to a novel mixer circuit capable of accepting three or more simultaneous inputs from separate signal sources with little or no interaction of one input upon the other.

Mixer circuits and their uses are well known in the art. One important use of a mixer circuit is in a marker signal generator useful for the visual alignment of an electronic circuit such as a television receiver. In co-pending United States patent application, Serial No. 457,014, filed September 20, 1954 in the names of R. C. Langford and F. W. Sippach, Jr., and entitled Apparatus for Testing Electronic Circuits and Components, there is disclosed an improved such method having numerous practical features not found in prior apparatus of this class. Briefly, such co-pending application discloses a method in which a portion of a frequency modulated sweep generator signal is applied to the vertical plates of an oscilloscope through the TV receiver circuit. Another portion of the sweep generator signal is applied to a mixer circuit that forms part of a marker signal generator. The signal of a self-contained, calibrated, variable frequency generator is also applied to the mixer circuit to produce mixer output beat signals having an envelope frequency that is the sum and difference of the two input signals. These beat signals are demodulated to produce peak signals of a desired polarity and such signals are amplified, clamped to ground level and applied to the Z-axis of the oscilloscope. Additional signals from a crystal controlled oscillator are also selectively injectable into the mixer circuit to provide side band marker signals. By so modulating the intensity of the oscilloscope electron beam precise, clearly visible markers are displayed on the oscilloscope screen even when the circuit under test has a very low, in fact zero, response to the sweep generator signal. Consequently, this method allows for accurate setting of trap circuits and bandwidth settings of very narrow bandwidth circuits.

The present invention is directed to a novel mixer circuit which, while useful in a general sense, is particularly adapted for use in a marker signal generator for the practice of the visual method of aligning a TV receiver.

An object of this invention is the provision of a novel signal mixer circuit for use in a marker signal generator of the class adapted for use in obtaining the response curve of an electronic circuit such as a television receiver.

An object of this invention is the provision of a novel mixer circuit capable of simultaneously accepting input signals from at least three separate sources and mixing such signals to provide resulting beat signals with a minimum of interaction of one input signal upon another.

An object of this invention is the provision of a novel mixer circuit for mixing at least three separate signals, said mixer circuit having an overall signal gain whereby the following circuitry need not have an unduly high amplification and thereby affording certain cost and operating economies.

An object of this invention is the provision of a mixer circuit capable of mixing a plurality of applied signals at frequencies as high as 260 megacycles and which circuit is not seriously affected by changes in the amplitudes of the signal inputs whereby adding or subtracting of the input signals may be accomplished in a stable manner.

These and other objects and advantages will become apparent from the following description when taken with the accompanying drawings illustrating the invention. It will be understood the drawings are for purposes of illustration and are not to be construed as defining the scope or limits of the invention, reference being had for the latter purpose to the claim appended hereto.

In the drawings wherein like reference characters denote like parts in the several views.

Figure 1:
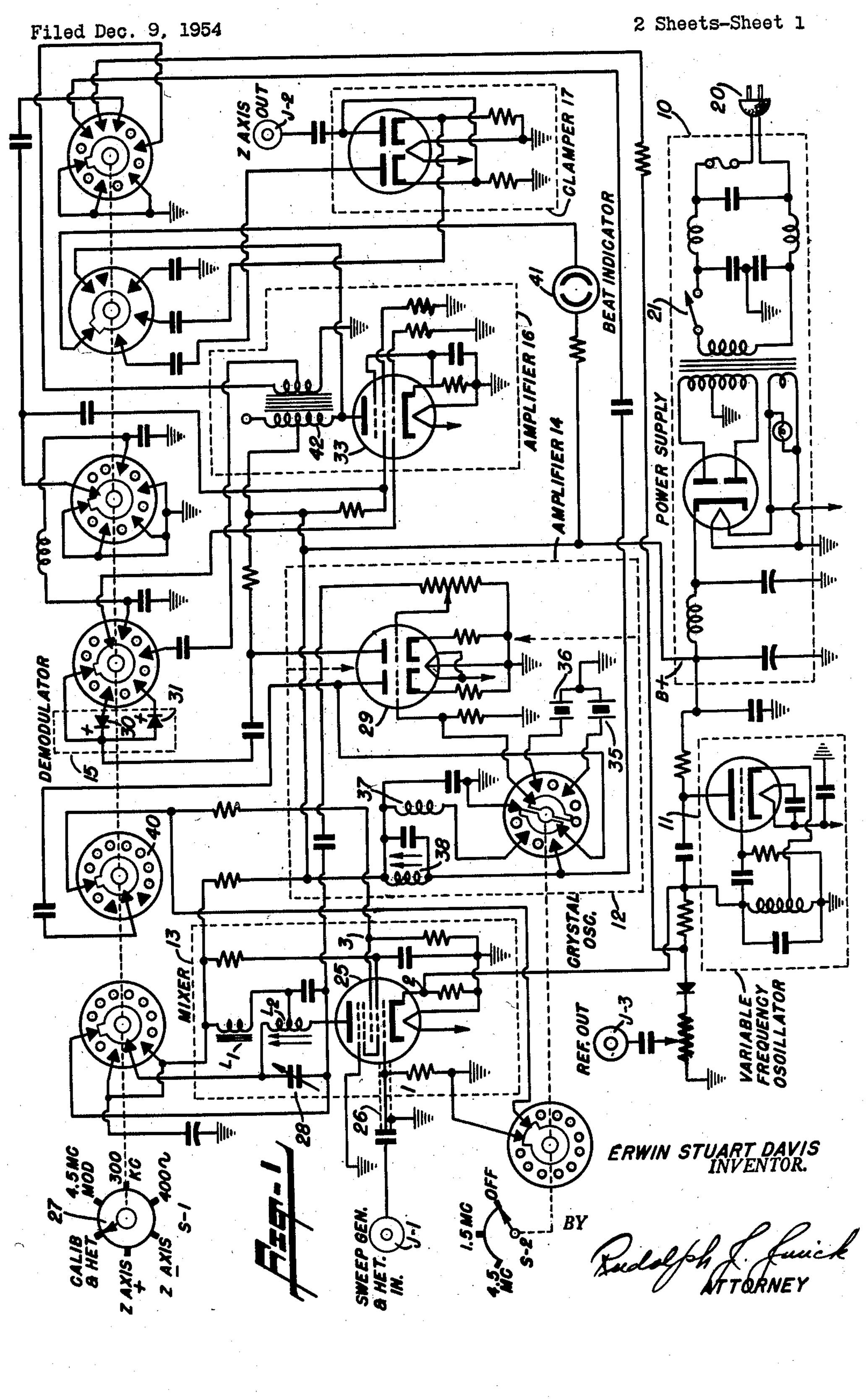
Figure 1 is a circuit diagram of a marker signal generator embodying the mixer circuit of this invention.

Reference is now made to Figure 1 wherein the main components of a marker signal generator comprise a power supply 10, a variable frequency oscillator 11, a crystal oscillator 12, a mixer 13, amplifier 14, demodulator 15, amplifier 16 and a clamper 17. Associated with these components are a 6-deck rotary switch S–1 and a 2-deck rotary switch S–2, each provided with a pointer and an indexing mechanism whereby the user may set each switch to condition the circuitry for a specific function. The power supply is of a conventional design and furnishes the necessary electrical energy for the various circuits upon insertion of the plug connector 20 into a 60 cycle 120 volt power line outlet and closure of the line switch 21. The variable frequency oscillator 11 is provided with a pointer movable over a scale calibrated in frequency values, the pointer and scale not being shown in the drawing. In fact, since the particular design of the variable frequency oscillator forms no part of the present invention the variation of the tank circuit for obtaining a desired oscillation frequency are shown only diagrammatically. However, those skilled in this art will understand that the oscillator frequency can be altered by rotating a single knob and the selected frequency of oscillation is read by observing the position of the pointer relative to the frequency calibrated scale.

The oscillating signal of the variable frequency oscillator is applied to the input terminal 2 of the mixer circuit which includes the pentagrid converter tube 25 such as a type 6BA7. It will be noted that the input terminal 2 is connected to the tube cathode. The mixer input terminal 1, being the lower grid of the tube 25, is connected to apparatus terminal J1 through a shield cable 26, such terminal being labeled Sweep Gen. & Het. In. This terminal, then, is the one to which the signal of a sweep generator is applied when the apparatus is used to obtain a response curve of a TV receiver and to which a signal of unknown frequency is applied when the apparatus is used to determine the frequency of such signal, all of which will be explained in more detail hereinbelow.

It may here be pointed out that the sweep generator signal is frequency modulated at a rate of 60 cycles per second. As described in more detail in the above-referenced co-pending patent application, a portion of such sweep generator signal is applied to the vertical beam-deflecting plates of an oscilloscope and another portion of such signal is applied to the mixer circuit 13. Since the sweep generator signal is applied to the apparatus when such apparatus is used to provide markers on the oscilloscope trace, the switch S–1 is set to the position marked Z-axis on the switch index dial 27. It will be noted that the sweep generator and variable oscillator signals are applied directly to the mixer tube 25, that is, the specific setting of the switch S–1 is immaterial so far as concerns the insertion of these two signals into the mixer circuit. These two signals result in a large number of intermodulation products and the desired signal components are selected by an impedance $L_2$, tuned by the condenser 28, connected in the plate circuit of the mixer tube. Such impedance preferably is tuned to 75 kilocycles whereby the mixer generates two output signals spaced 75 kilocycles above and below the frequency of the variable oscillator. These signals are amplified by the amplifier 14 (which consists of the right hand portion of the tube 29, type 12AT7) demodulated by one or the other of the diode rectifiers 30, 31, further amplified by the amplifier 16, clamped to ground level by the clamper 17 and appear at the apparatus terminal J2, labeled Z Axis Out. Such signal pulses provide the frequency marker points on the TV response curve as displayed on the oscilloscope screen. It is here pointed out that the diode rectifiers 30, 31 are reversely connected between spaced stationary contacts on the deck 32 of the switch S–1 and the plate of the amplifier section of the tube 29, and that the associated rotary switch contact is connected directly to the control grid of the amplifier tube 33. Thus, the polarity of the marker pulses appearing at the apparatus terminal J2 is determined by the setting of the switch S–2. When such switch is set in the position marked Z Axis (+) these marker signals will produce corresponding bright spots on the oscilloscope wave trace whereas a setting of the switch to the position marked Z Axis (—) will result in corresponding holes or blank spots on such trace. The former is known as positive Z axis modulation and the latter as negative Z axis modulation.

Since even the best oscillator circuits are subject to minor scale errors it is desirable that means be included in the apparatus to permit periodic standardization, or calibration, of the variable frequency oscillator. My novel mixer circuit permits ready attainment of this requirement.

The incorporated crystal oscillator 12 includes the crystals 35, 36 having fundamental frequencies of 1.5 and 4.5 megacycles, respectively. These crystals are selectively connected into the grid circuit of the oscillator portion of the tube 29 by proper rotation of the switch S–2, which switch also connects the appropriate one of the load coils 37, 38 into the plate circuit to thereby produce 1.5 to 4.5 megacycle oscillations. Any harmonic of these crystal oscillations may be used to check the calibration of the variable frequency oscillator. When the switch S–1 is set to the position marked Calib. & Het., as shown in the drawing, the crystal oscillator signal is applied to the mixer input terminal 3 through the closed switch contacts of the switch deck 40. The variable frequency oscillator is manually adjusted until a zero beat signal is obtained as indicated by the beat indicator 41. In this case the plate load on the mixer circuit is an untuned impedance L1 and responsive to low audio frequencies. When the difference frequency between the crystal oscillator signal and the variable oscillator signal is a predetermined, relatively small value, say about 1 kilocycle, the indicator 41, which is a gas-filled tube such as a neon bulb, will light up and the true beat point is indicated when the glow of the bulb is sharply extinguished upon a slight rotation of the knob controlling the output frequency of the variable frequency oscillator. The gas tube 41 is connected across the plate load coil 42 of the amplifier tube 33. Such gas tube has a minimum firing voltage and if the gain of the amplifier is set so that only the desired beat signals will have an amplitude exceeding the tube firing voltage all spurious beats and hum noises will not light up the tube. Consequently, this indicator, as specifically connected into the circuit, provides an economical, positive, visual indicator displaying only the useful fundamental beats of the mixer circuit output signals. If the pointer of the variable frequency oscillator is not aligned with the corresponding scale graduation the scale is shifted to obtain such indication coincidence. The foregoing visual beat signal arrangement and the shifting of the scale of the variable frequency oscillator are described in more detail and claimed in co-pending United States patent application Serial No. 462,928, filed October 18, 1954, in the names of R. C. Langford and S. Davis, and entitled Apparatus for Checking and Standardizing a Marker Signal Generator.

In the heterodyne detection circuit the unknown signal frequency is applied to the apparatus terminal J1 and is injected into the mixer stage along with the signal of the variable frequency oscillator. In this case the switch S–2 is set to the off position thereby turning off the crystal oscillator. The frequency of the unknown signal corresponds to that of the variable frequency oscillator when the true beat point is indicated by the gas tube 41.

When the switch S–1 is set to the Z axis (+) or Z axis (—) position, turning on of the crystal oscillator by an appropriate setting of the switch S–2 will produce side bands on the variable oscillator frequency. For example, if the variable frequency oscillator is set to 100 megacycles and the 4.5 megacycle crystal is connected into the circuit the mixer will provide three marker signals having frequencies of 95.5, 100 and 104.5 megacycles. In this manner, simultaneous markers are displayed on the oscilloscope trace thereby permitting simultaneous observation of video and sound carriers.

The crystal diode modulator 45 is used to place amplitude modulation on the variable oscillator output. As indicated by the markings on the dial 27 of the switch S–1, modulation signals of 400 cycles, 300 kilocycles and 4.5 megacycles are available. The 400 cycle modulation signal can be used for producing horizontal bars on the TV set for checking vertical linearity and the 300 kilocycle modulation signal can be used for producing vertical bars for checking horizontal linearity.

Figure 2:
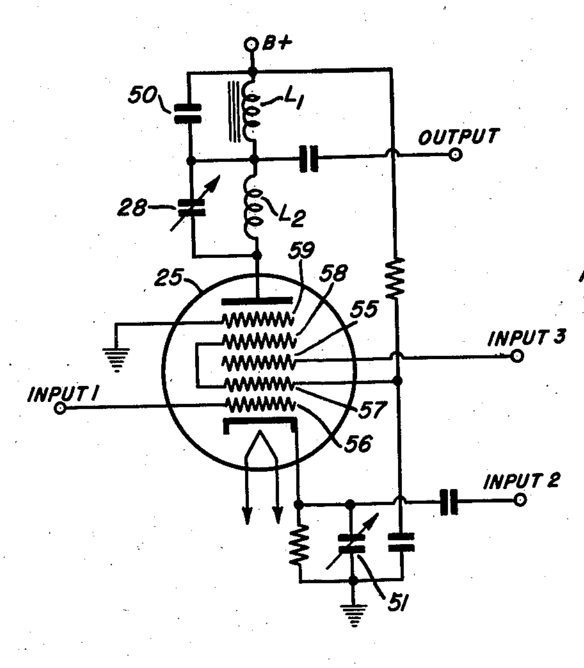
Figure 2 is a circuit diagram showing only those connections to the mixer tube which are necessary for a proper understanding of the invention.

While I have given a brief description of a complete marker signal generator the present invention specifically is concerned with the mixer circuit and reference is now made to Figure 2 which shows only those connections to the mixer tube 25 which are essential to an understanding of the invention. It will be noted that the anode of the mixer tube 25 contains two reactive loads; namely, the impedances $L_1$ and $L_2$ shunted respectively by the condensers 46 and 28. The functions of these load reactors are to select particular bands of frequencies produced from the various signals injected into tube input circuits 1, 2 and 3. Such reactive loads may be in the form of a tank circuit where maximum signal gain is required or they may take the form of a band pass filter where sharp frequency discrimination is required. It is also obvious that simple chokes may be substituted for any of the stated forms of load in certain applications. In fact, as used in the Figure 1 marker signal generator, the load element $L_1$ is an audio frequency choke and its function is to select the audio beats produced by beating the internal crystal oscillator against the variable frequency oscillator to permit accurate frequency settings of the indicating pointer and calibrated dial of the variable frequency oscillator. Such reactor is likewise used to determine the frequency of an unknown signal injected into the mixer circuit from an external source. The tank circuit comprising the inductance $L_2$ and condenser 28 is used to obtain R. F. pulses from a frequency modulated sweep generator signal. Since these pulses will occur at the resonant frequency of the tank circuit they are used as frequency markers on the oscilloscope trace. By making the tuning of the tank circuit variable a useful means is available to obtain a wide range of time-defined pulses.

In order to utilize the single tube 25 to mix a plurality of input signals which differ greatly in frequency, say 1.5 to 250 megacycles, and to maintain a substantially constant mixer gain, I inject the lower frequency signal on the center control grid 55. It is important to the proper functioning of the mixer, that is, to provide output beat signals with a minimum interaction of one input signal upon another, that the impedance of the circuit connected to the grid 55 be low and that such circuit provide sufficient voltage to create a virtual cathode in the region of the grids 55, 57 and 58. This latter condition requires a source capable of causing a significant grid current flow, that is, the source connected to the input terminal 3 must deliver a small amount of power. These conditions are most conveniently met by applying the signal output of the crystal oscillator to input terminal 3.

The grid 56, having the highest mutual conductance is most suitable for low level signals. Since such grid has the highest sensitivity and can operate throughout a wide impedance range, I desirably apply the sweep generator signal to input terminal 1. The cathode fundamentally is a low impedance terminal but due to its position in the mixer configuration it provides excellent coupling to the electron stream. I, therefore, apply the signal output of the variable frequency oscillator to the input terminal 2. The capacitor 51 provides a means to adjust the standing wave ratio which may be present on the radio frequency line feeding this input. At high frequencies this condenser may be necessary to obtain maximum signal strength at the mixer terminal or to avoid appearance of a voltage node in cases where the ratio of the R. F. line length to signal frequency approaches ½ wave length.

The grids 57 and 58 function as conventional screen grids but such grids can also be arranged for signal modulation as will now be described.

Figure 3:
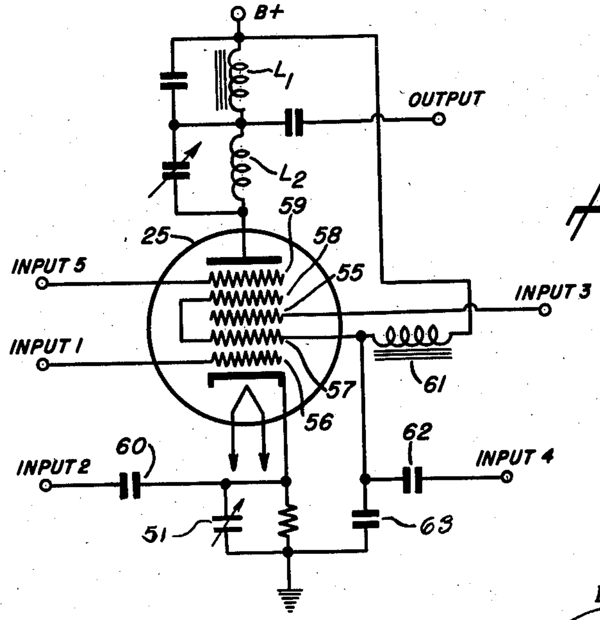
Figure 3 is similar to Figure 2 and showing five electron coupled input circuits to the mixer tube.

Reference is now made to Figure 3 which is a circuit diagram showing five electron coupled input circuits associated with the pentagrid converter tube 25. Here again the signal outputs of the crystal oscillator, the variable frequency oscillator and the sweep generator respectively are applied to the input terminals 3, 2 and 1. However, the grids 57, 58 are now connected to the B voltage source through an iron-cored inductance 61. A modulating signal can be impressed upon these grids through a capacitor 62. The suppressor grid 59 has a relatively high impedance but it can also serve as a fifth input terminal under appropriate conditions. It is here pointed out that the value of the capacitor 63 is so selected that it presents a moderate impedance to the modulation frequency impressed on the grids 57 and 58 through the capacitor 62. At the same time the values of the capacitor 63 and inductor 61 are such as to provide an effective grounding of the grids 57 and 58 for the purpose of by-passing the high frequency signals.

From the above description of my invention, it is apparent that my mixer circuit will accept simultaneous inputs from at least three signal sources and mix them with little or no interaction of one input upon another and that the gain of the mixer is not seriously affected by changes in the signal inputs. This latter feature permits adding or subtracting the various input signals at will. Tests have proven that the mixer circuit has a wide frequency response and a good overall gain as high as 400 megacycles.

Having now described my invention in accordance with the requirements of the patent statutes various changes and modifications will suggest themselves to those skilled in this art, and it is intended that such changes and modifications shall fall within the spirit and scope of the invention as recited in the following claim.

I claim:

An improved mixer circuit capable of accepting five input signals of different frequencies to produce resulting output beat signals with a minimum of interaction of one input signal upon another, said mixer circuit comprising an electron tube having an anode, a cathode and five grids; a load, including a pair of inductances in series, shunted respectively by a pair of condensers, between the anode and the positive terminal of an anode-biasing source for the purpose of selecting particular bands of frequencies produced from various signals injected into said tube input circuits; circuit elements to impress a sweep generator signal on the number 1 grid which is located nearest the cathode; circuit elements to impress through a first capacitor the signal output of a variable frequency oscillator on the cathode; circuit elements connecting grids number 2 and 4 to the positive terminal of said source through a reactor and to ground through a second capacitor; circuit elements to impress the signal output of a crystal oscillator to grid number 3; circuit elements to impress a modulating signal on both grids number 2 and 4 through a third capacitor; and circuit elements to impress a fifth input signal directly on grid number 5.

References Cited in the file of this patent

UNITED STATES PATENTS

| | | |
|---|---|---|
| 1,915,378 | Osnos | June 27, 1933 |
| 2,171,151 | Urtel | Aug. 29, 1939 |
| 2,199,273 | Schlesinger | Apr. 30, 1940 |
| 2,571,001 | Anderson | Oct. 9, 1951 |

FOREIGN PATENTS

| | | |
|---|---|---|
| 503,876 | Great Britain | Apr. 17, 1939 |